(12) United States Patent
Van Bortel

(10) Patent No.: US 9,883,757 B2
(45) Date of Patent: Feb. 6, 2018

(54) FRAME WITH INTEGRATED SURFACE ATTACHMENT FOR DRYWALL AND DRYWALL-LIKE SURFACES

(71) Applicant: Brett Van Bortel, Winfield, IL (US)

(72) Inventor: Brett Van Bortel, Winfield, IL (US)

(*) Notice: Subject to any disclaimer, the term of this patent is extended or adjusted under 35 U.S.C. 154(b) by 0 days.

(21) Appl. No.: 15/043,894

(22) Filed: Feb. 15, 2016

(65) Prior Publication Data

US 2016/0166089 A1    Jun. 16, 2016

Related U.S. Application Data

(60) Continuation of application No. 14/071,172, filed on Nov. 4, 2013, now Pat. No. 9,259,105, which is a division of application No. 13/282,072, filed on Oct. 26, 2011, now Pat. No. 8,572,873, which is a continuation-in-part of application No. 11/936,592, filed on Nov. 7, 2007, now abandoned.

(51) Int. Cl.
| | | |
|---|---|---|
| A47F 1/14 | (2006.01) | |
| A47G 1/06 | (2006.01) | |
| A47G 1/20 | (2006.01) | |
| A47G 1/22 | (2006.01) | |
| G01C 9/26 | (2006.01) | |
| G09F 1/12 | (2006.01) | |

(52) U.S. Cl.
CPC .............. *A47G 1/06* (2013.01); *A47G 1/205* (2013.01); *A47G 1/22* (2013.01); *G01C 9/26* (2013.01); *G09F 1/12* (2013.01); *Y10T 29/49895* (2015.01)

(58) Field of Classification Search
CPC .. A47G 1/22; A47G 1/16; A47G 1/168; A47G 1/17; F16B 15/0007; F16B 35/041
USPC ............ 248/467, 489, 494; 411/458; 40/781
See application file for complete search history.

(56) References Cited

U.S. PATENT DOCUMENTS

| | | | | |
|---|---|---|---|---|
| 417,805 | A * | 12/1889 | Beaman ................... | A47G 1/16 248/466 |
| 920,236 | A * | 5/1909 | Albee ...................... | A47G 1/17 24/DIG. 11 |
| 1,019,670 | A * | 3/1912 | L'Hommedieu ........ | A47G 1/16 248/489 |
| 1,149,141 | A * | 8/1915 | Hook ................... | A47G 1/1606 160/349.1 |
| 1,272,969 | A * | 7/1918 | Korn ..................... | F21V 29/004 362/240 |
| 1,297,584 | A * | 3/1919 | Mock .................. | F16B 15/0007 248/217.3 |

(Continued)

*Primary Examiner* — Shin Kim
(74) *Attorney, Agent, or Firm* — Neal Gerber & Eisenberg LLP

(57) ABSTRACT

A frame and a device for mounting a plurality of frames in a grid. The frame has an axial first mounting member and a second mounting member, the first mounting member having a generally flat portion exposed to and generally flush with a perimeter surface of the frame. The alignment device has a cross-shaped body having a pair of horizontal members and a pair of vertical members intersecting at a common point, the horizontal and vertical members having interior surfaces defining four quadrants, the alignment device further comprising a level attached to the cross-shaped body and a magnet mounted in a recess in one of the horizontal members or vertical members. The alignment device used to position and mount the frame.

11 Claims, 7 Drawing Sheets

(56) References Cited

U.S. PATENT DOCUMENTS

| | | | | |
|---|---|---|---|---|
| 1,496,282 A * | 6/1924 | Taylor | A47G 1/22 | 248/466 |
| 1,901,644 A * | 3/1933 | Harsin | A47G 1/22 | 248/489 |
| 2,082,577 A * | 6/1937 | Herschmann | A47G 1/22 | 206/343 |
| 2,127,078 A * | 8/1938 | Zwicker | A47G 1/06 | 40/711 |
| 4,524,939 A * | 6/1985 | Hogg | A47G 1/168 | 248/216.1 |
| 5,080,317 A * | 1/1992 | Letizia | A47G 1/168 | 248/466 |
| 5,165,650 A * | 11/1992 | Letizia | A47G 1/168 | 248/467 |
| 5,433,569 A * | 7/1995 | Fall | B25B 13/5091 | 248/217.4 |
| 6,338,215 B1 * | 1/2002 | Vincent | A47G 1/065 | 40/729 |
| 6,484,996 B2 * | 11/2002 | Astell | A47G 1/1653 | 248/455 |
| 6,918,187 B2 * | 7/2005 | Schaefer | G01C 9/26 | 33/365 |
| 8,572,873 B2 * | 11/2013 | Van Bortel | A47G 1/06 | 248/475.1 |
| 9,259,105 B2 * | 2/2016 | Van Bortel | A47G 1/06 | |
| 2005/0006552 A1 * | 1/2005 | Giles | A47G 1/168 | 248/467 |
| 2007/0119084 A1 * | 5/2007 | Schymura | A47G 1/0616 | 40/738 |

* cited by examiner

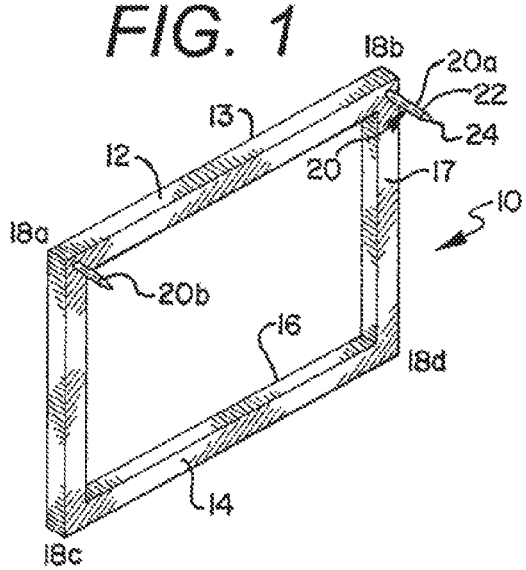
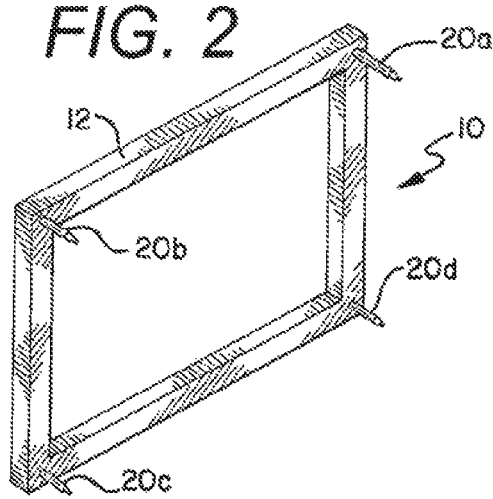
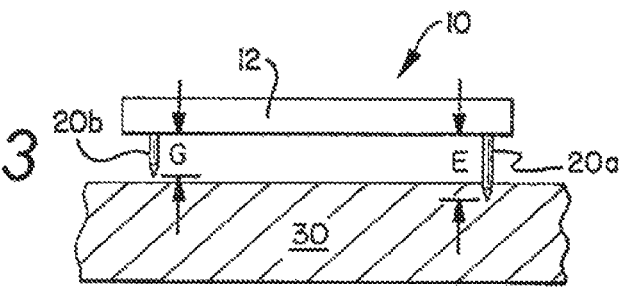
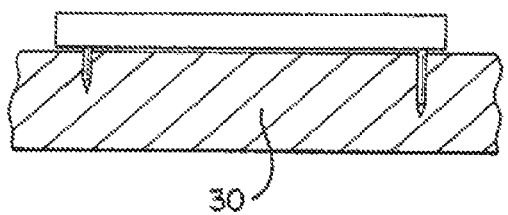
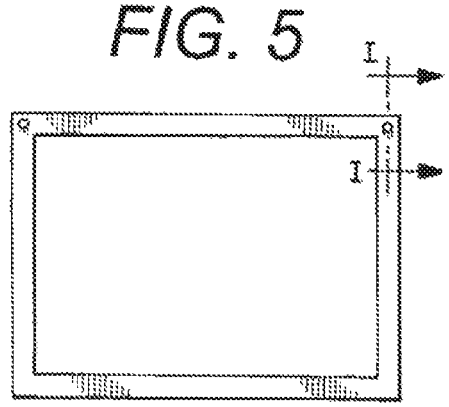
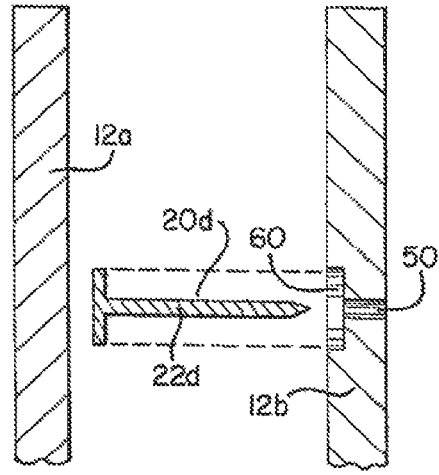

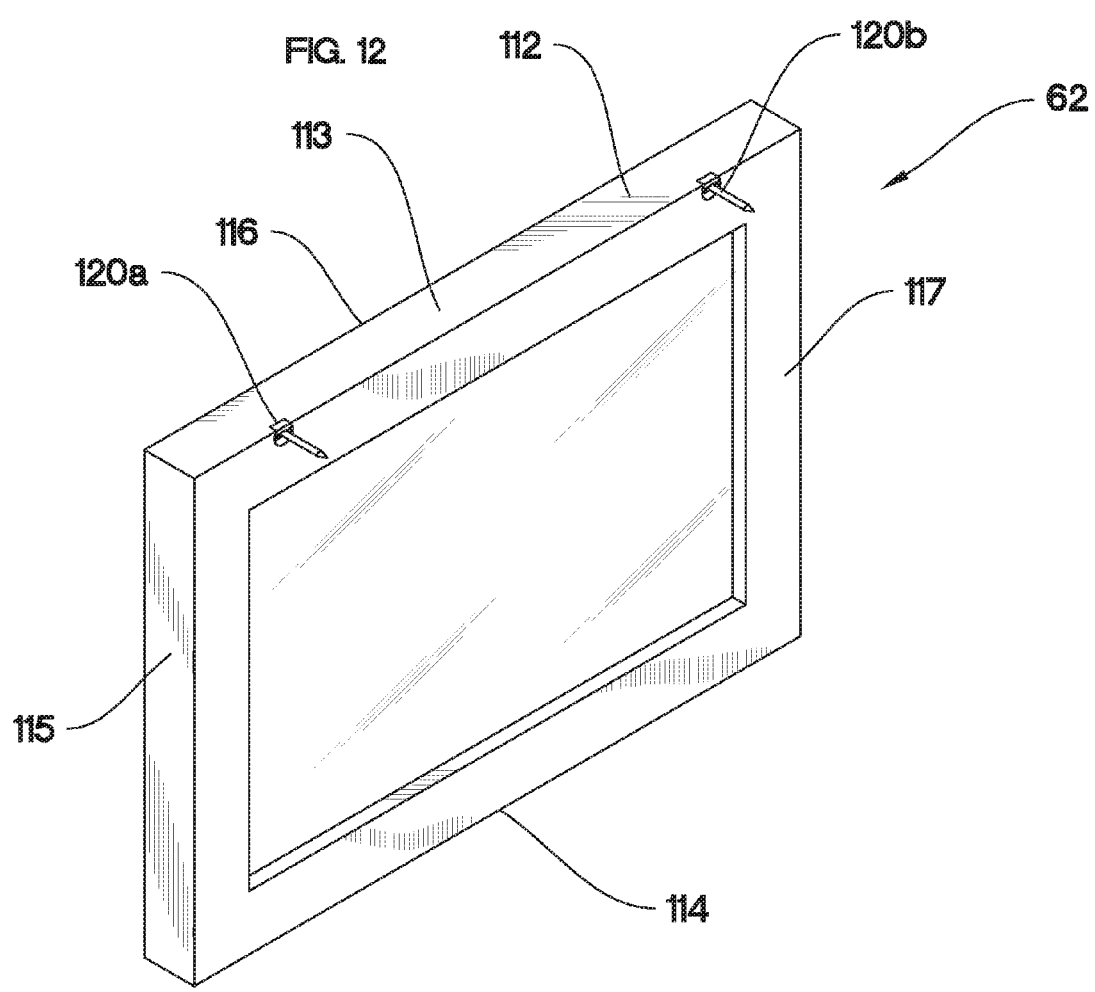

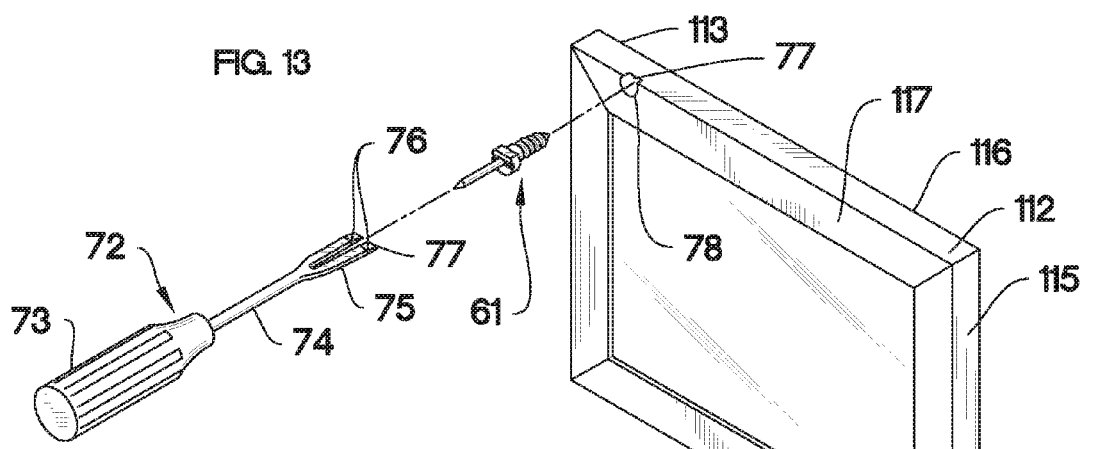
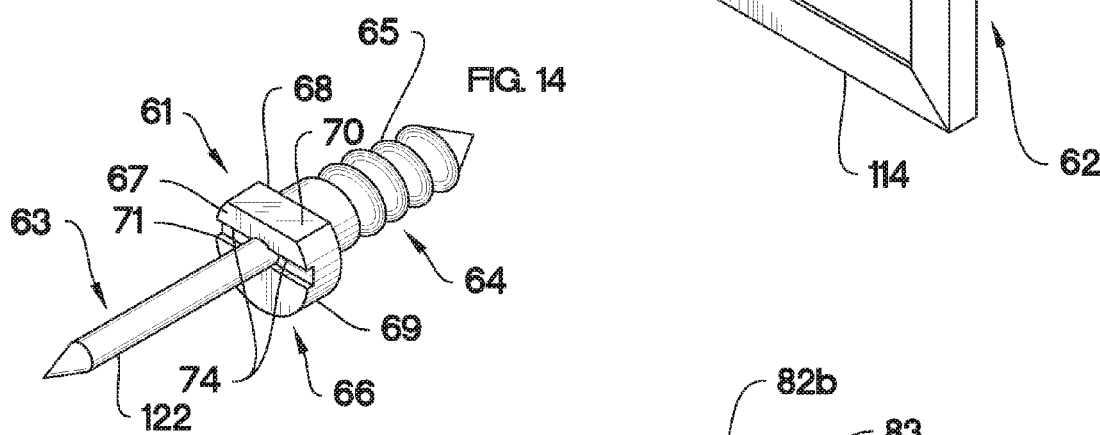
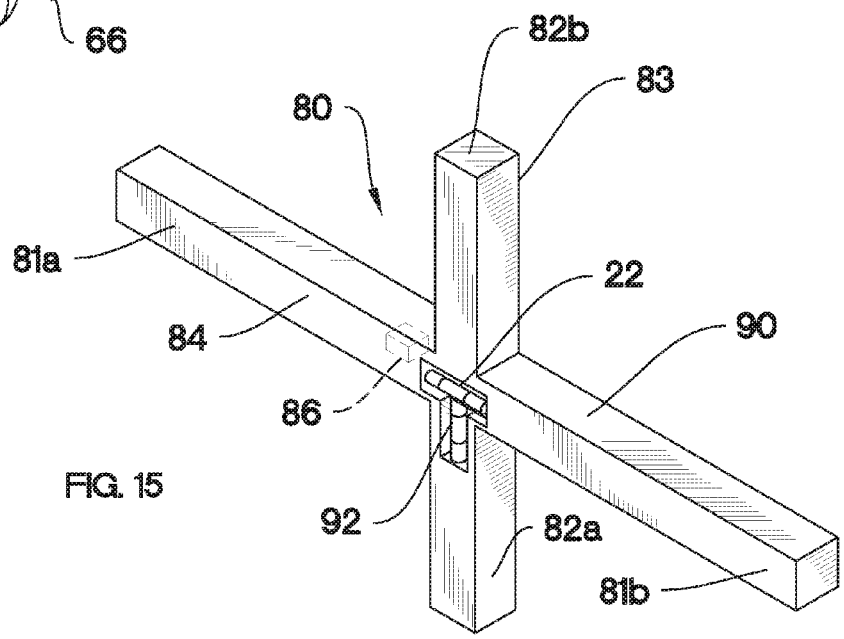

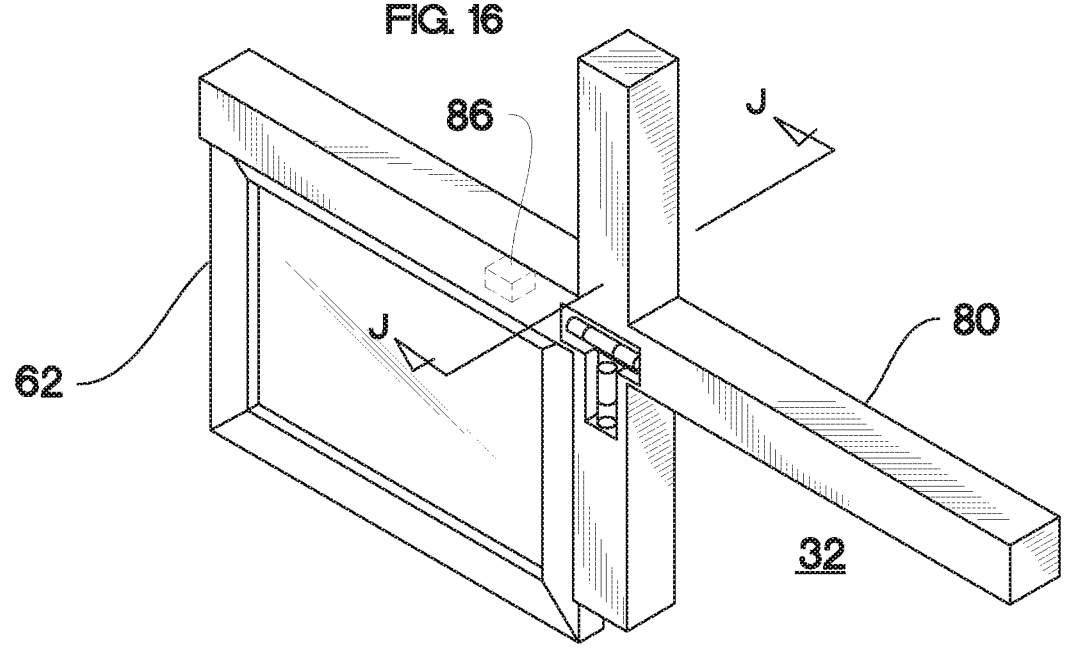
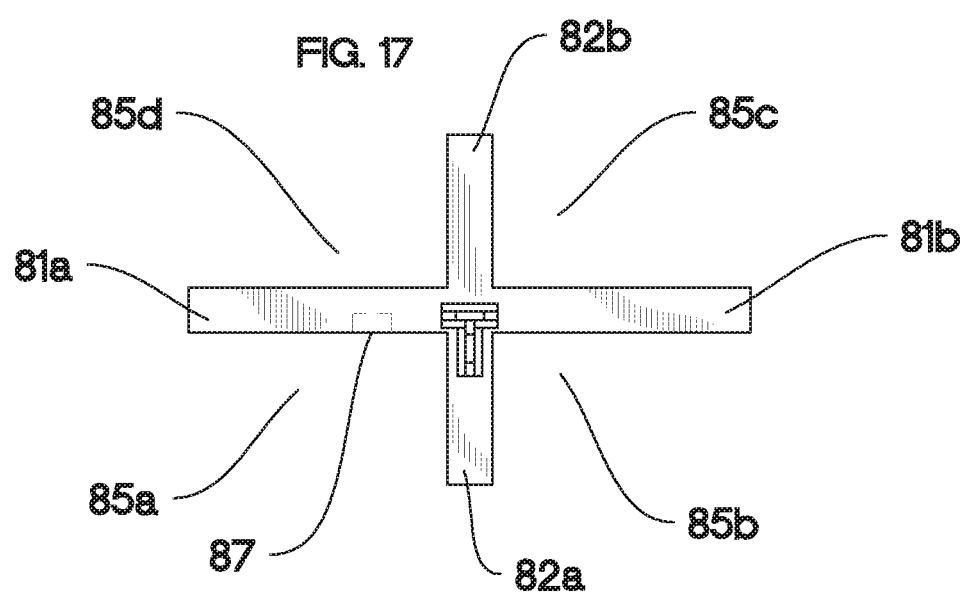

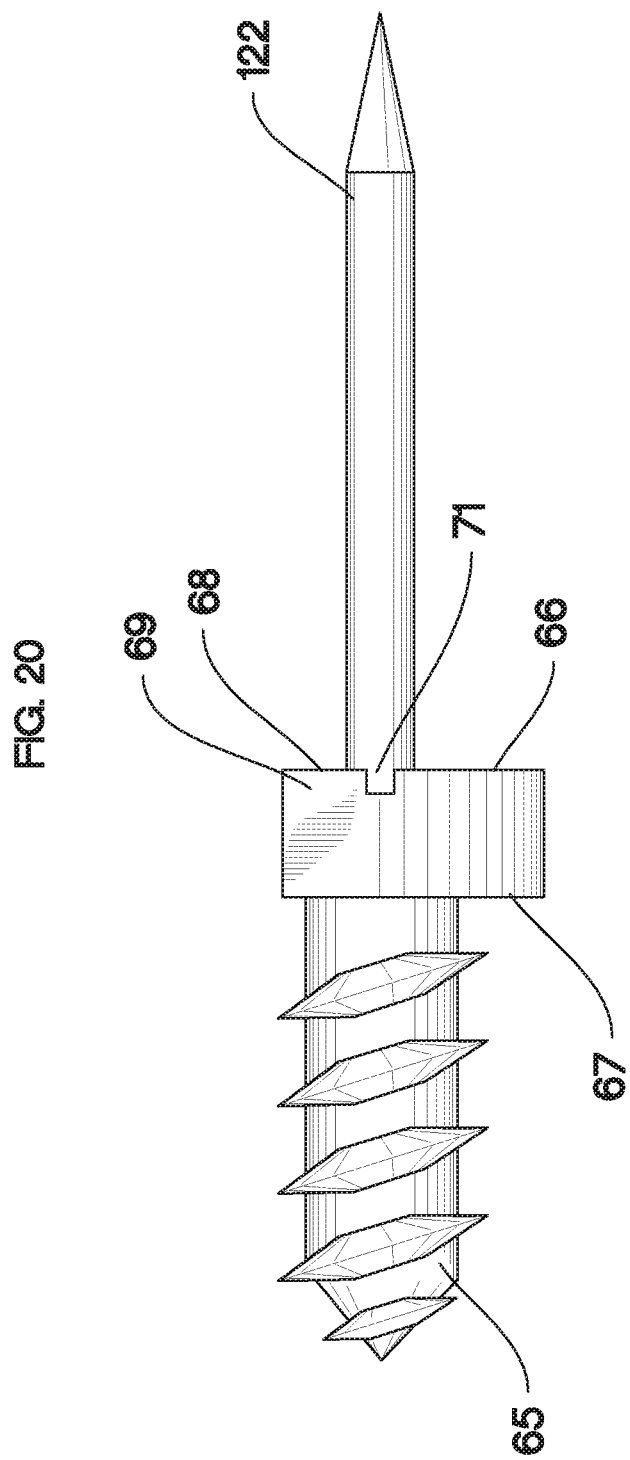

FRAME WITH INTEGRATED SURFACE ATTACHMENT FOR DRYWALL AND DRYWALL-LIKE SURFACES

This application is a continuation of Ser. No. 14/071,172 filed on Nov. 4, 2013, which is a divisional of U.S. patent application Ser. No. 13/282,072 filed on Oct. 26, 2011, now U.S. Pat. No. 8,572,873, which is a continuation in part of U.S. patent application Ser. No. 11/936,592 filed on Nov. 7, 2007, now abandoned, the contents of all of which are specifically incorporated by reference herein in their entirety.

TECHNICAL FIELD

The subject matter disclosed herein relates to frames used for displaying items, and, more particularly, a frame having an integrated surface attachment. Another aspect of this subject matter relates to a systems and methods for installing such frames.

BACKGROUND

Many different types of frames for displaying various items such as pictures, posters, paintings and objects have been developed over the years and numerous mounting devices for attaching such frames to a surface such as a wall have been developed. Although some of these mounting devices have provided adequate results, many of them suffer from several chronic problems or drawbacks. For example, many of these mounting devices are separate from the frame and require that a user first make precise measurements and then attach the mounting device to the wall, and later add the frame to the mounting device. This multi-step process is not only cumbersome, but often results in a situation where the mounting hardware does not perfectly align with the frame, which results in a misplaced or misaligned frame, especially when a user is mounting multiple frames that are intended to be aligned with one another. Some of these mounting devices also result in a gap between the frame and the wall that may be aesthetically displeasing. In addition, some of these mounting devices result in a frame that can be knocked off of the mounting device. Some such mounting devices may leave a large hole in the wall or other disfiguration when they are removed.

Others of these mounting devices use mounting posts with tapered ends that are driven into or screwed into a frame. One drawback of such mounting posts is that they may split a wooden or plastic frame when they are driven or screwed into the frame. Another drawback of some such mounting posts is that they may pull away from the frame if the user attempts to remove the frame from wall surface to reposition it. Yet another drawback of some such mounting posts is that they require a special tool to attach the mounting post to the frame so that an assembler does not injure themselves on the tapered end of the post that pierces the wall surface. For an installer who is attempting to install a grid of evenly-spaced frames, the drawbacks associated with mounting traditional frames are exacerbated by the number of frames that need to be mounted to create a grid. Imprecision in positioning traditional frames are also highlighted when frames are mounted in a grid, because the grid of frames serve as reference points and reference lines that make an unlevel or out of position frame in a grid more noticeable.

Embodiments disclosed herein address these and other concerns and generally provides an improved frame with integral mounting posts that can be mounted to a wall having drywall or drywall-like construction simply by pushing on the frame. Such frames can also easily be removed from the wall and repositioned. In another embodiment, such frames can be used in conjunction with an alignment device to quickly and accurately create a grid of evenly spaced wall-mounted frames.

SUMMARY OF THE INVENTION

In an embodiment, a cost-effective frame provides, among other things, simple and efficient mounting, alignment, and repositioning of the frame on a wall having a drywall or drywall-like surface. The frame includes a mounting arrangement that allows the frame to be aligned and mounted to the wall simply by pushing the frame against the wall to force at least one mounting member of the mounting arrangement to penetrate the wall and mount the frame on the wall.

In accordance with one or more principles of the invention, the frame includes at least two integrated mounting members, preferably in the form of mounting posts, extending from a back surface of the frame. However, embodiments having more than two mounting members are also contemplated. In a particular embodiment, the frame includes two mounting posts, one which is longer than the other, the two of which are located at opposite corners of the frame. This configuration permits a user to push the longer post partially into the wall, while the shorter post does not pierce the wall. The longer post fixes a mounting point on the wall, while allowing the user to rotate or pivot the frame about the axis of the longer post in order to level the frame. When the frame is at the desired position, the user then pushes the frame such that its back surface is flush with the wall, thereby further penetrating the wall with the longer post and allowing the shorter post to penetrate the wall and preventing further movement of the frame relative to the wall.

According to another aspect, the mounting members are positively retained in a framing member, thereby simulating an integrated mounting member arrangement. Specifically, in a particular embodiment, the mounting posts have a retention member and a shaft portion. The retention member extends outward from the shaft and is mounted within a framing member such that the mounting posts will not pull away from the frame when the frame is removed from a wall. For example, in one such embodiment, the framing member may be made of a first portion and a second portion that are joined together. Prior to the first and second portions being joined together, the shaft of the mounting post may be inserted through a hole in the second framing portion having a diameter smaller than the width of the retention member so that the retention member is held between the first and second framing portions.

In yet another embodiment, the mounting members are unitary with the frame, i.e., completely integrated as an integral part of the frame. For example, in a particular embodiment, the mounting posts may be integrally formed as part of a cast metal frame or an injection molded plastic frame in a protrusion-like form.

In another variation, the mounting member takes the form of a specialized fastener having a threaded side, a shaft opposite the threaded side, and a ferrous contact surface. The ferrous contact surface is exposed via an opening in a side of a framing member. This embodiment may be used in conjunction with an alignment device having a magnet positioned to be aligned and magnetically attract the contact surface of the fastener to position and level the frame. That alignment device may be used to mount multiple frames to create an aesthetically pleasing grid of frames.

These and other aspects of the invention will become readily apparent upon consideration of the drawings, written specification, and claims set forth herein.

BRIEF DESCRIPTION OF DRAWINGS

FIG. 1 is a perspective view of a particular embodiment of a frame in accordance with one or more principles of the invention.

FIG. 2 is a perspective view of a second particular embodiment of a frame in accordance with one or more principles of the invention.

FIG. 3 is a top view of the frame of FIG. 2 illustrating a first stage of engagement wherein the frame is partially mounted in a wall.

FIG. 4 is a top view of the frame of FIG. 2 illustrating a second stage of engagement wherein the frame fully mounted in a wall.

FIG. 5 is a back view of the frame of FIG. 2.

FIG. 6 is a partial exploded view of a cross-section of an embodiment of the frame of FIG. 5 taken along line I-I.

FIG. 12 is a perspective view of another embodiment of the frame.

FIG. 13 is a perspective view illustrating assembly of an embodiment of a fastener being assembled to the embodiment in FIG. 12.

FIG. 14 is a perspective view of the fastener of FIG. 12.

FIG. 15 is a perspective view of an embodiment of an alignment device.

FIG. 16 is a perspective view illustrating use of the frame of FIG. 12 with the alignment device of FIG. 15.

FIG. 17 is a front view of the alignment device of FIG. 15.

FIG. 20 is a side view of the fastener of FIG. 14.

DETAILED DESCRIPTION OF PREFERRED EMBODIMENTS

Figure 7:
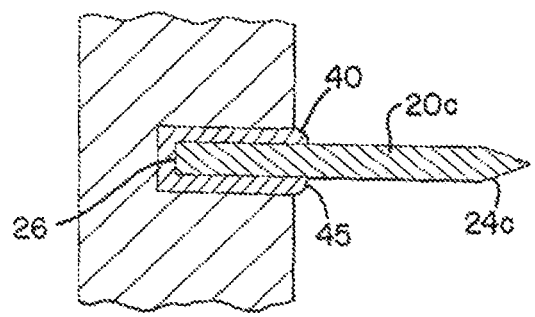
FIG. 7 is a partial cross-sectional view of an embodiment of the frame of FIG. 5 taken along line I-I.

The description that follows describes, illustrates and exemplifies one or more particular embodiments of the invention in accordance with one or more of its principles. This description is not provided to limit the invention to the embodiments described herein, but rather to explain and teach the principles of the invention in such a way to enable one of ordinary skill in the art to understand these principles and, with that understanding, be able to apply them to practice not only the embodiments described herein, but other embodiments that may come to mind in accordance with these principles. The scope of the present invention is intended to cover all such embodiments that may fall within the scope of the appended claims, either literally or under the doctrine of equivalents.

It is noted that in the description and drawings, like or substantially similar elements may be labeled with the same reference numerals. However, sometimes these elements may, but not always, be labeled with differing numbers in cases where such labeling may facilitate a more clear description. Additionally, the drawings set forth herein are not necessarily drawn to scale, and in some instances proportions may have been exaggerated to more clearly depict certain features.

In accordance with one or more principles of the invention, FIGS. 1-10 show a frame 10. The frame 10 has a framing member 12. The framing member 12 shown in FIGS. 1-10 has a front surface 16, a back surface 17, a top portion 13 and a bottom portion 14. The framing member 12 is shown in this embodiment as a rectangle having corners 18a-d, however, the framing member may be any shape. Although the figures depict a framing member 12 having four sides and a hollow middle portion, alternatively or additionally, the framing member may comprise a solid back portion such as the backing of a plaque or the back portion of a display case or of a picture frame. The framing member 12 is preferably made from a rigid material such as wood, plastic, or metal.

As shown in FIG. 1, the frame 10 further includes a mounting member arrangement, preferably in the form of at least two mounting posts 20a and 20b, which provides a dual point attachment that eliminates shifting and movement of the frame when attached to a wall, as will be described in more detail below. The mounting posts 20a and 20b each have a shaft 22 extending from the framing member 15. The mounting posts 20a and 20b also each have a tapered end 24. The mounting posts 20a and 20b each further have a blunt end 26, as shown in FIG. 7. The mounting posts are preferably made of metal, but may be a rigid plastic or any other material sufficiently strong to pierce a mounting surface, such as a wall incorporating sheetrock or drywall, without breaking or buckling. Although the mounting members described herein are cylindrical, numerous other elongate geometries could also be employed without departing from the principles of the present invention. For simplicity, the embodiments herein will be described with respect to mounting posts, with the understanding that the present invention is not limited to mounting posts, as other mounting member embodiments could also be employed.

A user can simply push the frame 10 against a mounting surface, which is typically a wall, thereby piercing the mounting surface with the mounting post 20 in order to mount the frame 10 to the surface. The frame 10 can be mounted to any surface capable of being penetrated by the mounting posts under typical forces applied by hand to the frame 10. In a preferred embodiment, the frame 10 is mounted to drywall or sheetrock constructed walls. However, some forms of walls made of plaster, wood, wood paneling, cork or foam bulletin board may be suitable as well if the mounting posts can penetrate the wall material without excessive force or the use of tools. Such materials are considered "drywall-like" materials for purposes of this specification. For convenience, the mounting surface will be referred to herein as a wall, without specific regard for any particular wall material.

As shown in FIG. 2, multiple mounting posts 20a-20d may be used to provide greater retention to the wall, distribution of weight for larger frames, and to provide for alignment of the frame 10 to the wall. In a preferred embodiment, mounting post 20a is longer than the other posts to provide the positioning and alignment functionality as described below with respect to the two-post arrangement of FIGS. 1, 3 and 4.

Referring to the embodiment depicted in FIGS. 1, 3 and 4, the frame 10 has a first mounting post 20a and a second mounting post 20b. As shown in FIG. 3, the first mounting post 20a extends from the back surface 17 of the framing member 12 a distance E, which is greater than the distance G that the second mounting post 20b extends from the back surface 17. This embodiment enables the user to mount the frame 10 to the wall 30 by first positioning the frame 10 by inserting the first mounting post 20a and then rotating the frame 10 relative to the wall 30 about the first mounting post 20a to level the frame 10. When the desired level is achieved, the user can then press the second mounting post 20b into the wall 30, resulting in the mounted frame 10 as shown in FIG. 4.

FIGS. 3 and 4 show the two stages of engagement of this embodiment. Specifically, a user can mount the frame 10 by first pressing the frame 10 against the wall 30 so that the first mounting post 20a pierces into the wall 30, but the second mounting post 20b does not, as shown in FIG. 3. The user then rotates the frame 10 relative to the wall 30 about the axis of the first mounting post 20a to the desired position. As shown in FIG. 4, when the frame 10 is in the desired position, the user then presses the framing member 12 closer to the wall 30 so that the second mounting post 20b pierces the wall, thereby preventing further rotation of the frame 10 relative to the wall 30.

In a particular embodiment, the mounting posts 20a and 20b are sized such that the maximum length of the portion of the mounting posts 20a and 20b extending from the back surface 17 of the framing member 12 is less than the typical thickness of standard wallboard, such as ½ inch and ⅝ inch thick drywall, so that the mounting posts 20 do not risk contacting electrical wires located in the wall 30. However, to ensure compatibility with various walls, longer lengths can be employed. In a particular embodiment, the length of the second mounting post 20b is between ¼ and ⅜ inches shorter than the first mounting post 20a, so that the first mounting post 20a does not slip from the wall 30 while the user is rotating the frame 10 prior to seating the second mounting post 20b in the wall 30.

As shown in FIGS. 5-9, the mounting posts 20 may be mounted in the framing member 12 in a variety of ways. For simplicity, each of the embodiments with respect to FIGS. 6-10 are described in terms of a cross-sectional view taken along line I-I in FIG. 5, with the understanding that each of these cross-sectional views represents a distinct embodiment.

A particular embodiment of the attachment of the mounting post 20 in the framing member 12 is shown in FIG. 7. In FIG. 7, the framing member 12 has a bore 40 formed in the back surface 17 of the framing member 12. The mounting post 20c has a shaft 22c, a tapered end 24c and a blunt end 26c. The diameter of the shaft 22c is smaller than the diameter of the bore 40 such that the mounting post 20c can be positioned in the bore 40. The mounting post 20c is further secured to the framing member 12 via an adhesive layer 45 that adheres the mounting post 20c to the walls of the bore 40. The adhesive 45 may be a thermoplastic adhesive such as a hot melt adhesive, a chemically reactive adhesive such as an epoxy adhesive or any other suitable adhesive.

The bore 40 typically has an axis generally perpendicular to the back surface 17 of the framing member 12. Thus, the axis of the mounting post 20c, which is seated in the bore 40, is generally perpendicular to the back surface 17 of the framing member 12 and the surface of the wall in which the mounting post is seated. Therefore, the force directed on the attachment of the mounting post 20c and the bore 40 by the weight of the framing member 12 and framed object, is generally perpendicular to the axes of the bore 40 and the mounting post 20c. This prevents the mounting post 20c from separating from the bore 40 under the weight of the framing member 12 and the framed object. Similarly, the axes of the mounting post 20c and the hole formed in the wall by the mounting post 20c are generally perpendicular to the force generated by the weight of the framing member 12 and framed object, thereby preventing the mounting post 20c from pulling loose from the wall.

Figure 8:
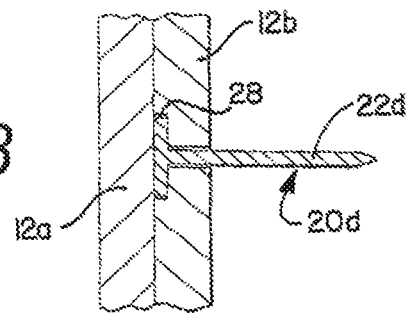
FIG. 8 is a partial cross-sectional view of an embodiment of the frame of FIG. 5 taken along line I-I.
Figure 11:
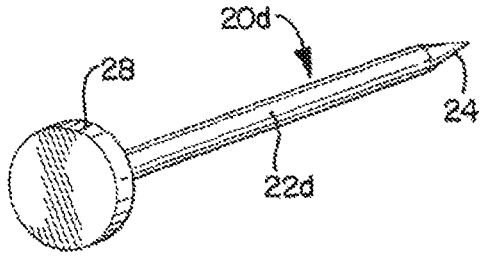
FIG. 11 is a perspective view of an exemplary mounting post of the frame of FIG. 6.

FIGS. 6 and 8 show an alternative embodiment of the attachment of the mounting post 20d to the framing member 12. FIG. 8 is a cross section of the mounting post and framing member. FIG. 6 is and exploded view of cross-section shown in FIG. 8. In this embodiment, the mounting post 20d is positively retained to the framing member 12. The mounting post 20d has a retention member 28 extending outward from the shaft 22d of the mounting post 20d. An exemplary embodiment of the retention member 28 is shown most clearly in FIG. 11 as a flange extending radially outward from the shaft 22d at an end of the mounting post 20d. However, the retention member may be any other shape provided that it extends outward from the shaft 22d.

As shown in FIGS. 6 and 8, the framing member is comprised of a first framing portion 12a and a second framing portion 12b. The second framing portion 12b is attached to the first framing portion 12a preferably by an adhesive (not shown), however it may be attached by any other attachment method as would be obvious to those of skill in the art. As shown in FIG. 6, the second framing portion 12b has a bore 50 formed therein, through which shaft 22d of the mounting post 20d passes. The diameter of the bore 50 is sized so that the retention member 28 of the mounting post 20d cannot pass through the bore 50, thereby retaining the mounting post 20d to the framing members 12a and 12b. In this embodiment, the diameter of the shaft 22d is preferably only slightly smaller than the diameter of bore 50 so that the mounting post 20d does not rock or slide with respect to the framing member.

The second framing portion 12b has a recess 60 having geometry similar to the geometry of the retention member 28 of the mounting post 20d, so that the retention member 28 of the mounting post 20d is seated between the first framing portion 12a and the second framing portion 12b. Alternatively, the first framing portion 12a may contain the recess 60, or both the first framing portion 12a and the second framing portion 12b may each contain a portion of the recess 60.

Figure 9:
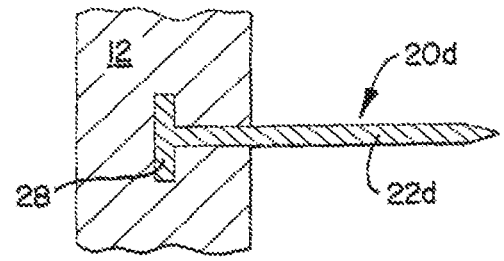
FIG. 9 is a partial cross-sectional view of an embodiment of the frame of FIG. 5 taken along line I-I.

FIG. 9 shows another embodiment of the attachment of the mounting post 20d to the framing member 12. FIG. 9 is a cross sectional area of the mounting post 20d and framing member 12. In this embodiment, the mounting post 20d is positively retained in the framing member 12. The mounting post 20d has a shaft 22d and a retention member 28. The retention member 28 is surrounded by the material of the framing member 12 thereby tightly securing the mounting post 20 in the framing member 12. One method of producing this embodiment is to utilize insert molding techniques to mold the framing member 12 around the retention member 28.

Figure 10:
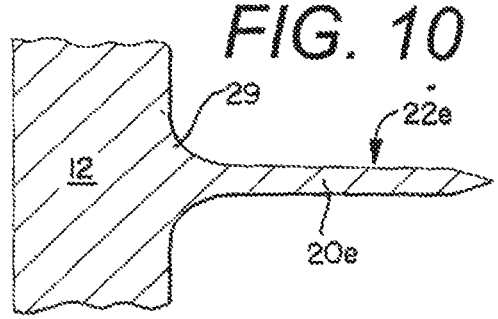
FIG. 10 is a partial cross-sectional view of an embodiment of the frame of FIG. 5 taken along line I-I.

FIG. 10 shows another embodiment in which the framing member 12 and the mounting post 20e are unitary. In this embodiment, the mounting post 20e extends from the back surface 17 of the framing member 12. The mounting post 20e has a shaft 22e and a tapered end 24e. This embodiment may also include a fillet 29 where the shaft 22e meets the framing member 12 to reduce the stress concentration at this location. This embodiment may be produced by injection molding plastic or casting metal, or by any other method of forming or machining a rigid material.

A benefit of the two mounting post arrangement is its dual fixed point attachment, which eliminates canting and tilting of picture frames, particularly in high traffic areas, such as a staircase. The fixed point attachment eliminates the hardware "links" that are typically associated with other mounting schemes. In other mounting schemes, hardware is usually mounted to the wall, such as a nail or hook, and also to the frame, such as a hook, loop, or cable, and these two pieces of hardware are then "linked" together. This linkage creates the opportunity for movement between the frame, the hardware, and the wall. With the fixed point attachment of the present invention facilitated by the mounting posts, all of these links are eliminated, resulting in a rigid, non-moving connection directly between the frame and the wall. By utilizing dual, or other multiples of these fixed point attachments, canting and tilting of the frames is also eliminated.

Other advantages of the foregoing embodiments are numerous. For example, and without limitation, the frame is easily mounted to the wall by simply pressing on the front of the frame without the need for tools and without the need to align hardware linkages between cables, eyelets, hooks, etc. Since the mounting arrangement is integrated with the frame, it is ready to be mounted out of the package without the need to first mount hardware to the wall or the frame. In addition, the frame can be removed from one location and remounted in another location simply by pulling the frame out of the wall at its first location and pushing it into the wall at a second location. These embodiments can also easily be leveled or aligned with other objects or frames via the dual-length mounting post arrangement. The mounting posts of the frame are robustly attached to the framing member so that the frame can be remounted many times. Furthermore, such remounting only leaves small holes in the wall. These embodiments also easily and safely and cost-effectively manufactured by attaching the mounting posts to the framing member by any of the attachment means described above. These embodiments also enable the frame to be mounted to the wall with a minimal gap between the wall and the framing member. These are just some of the many advantages that may become apparent to one of ordinary skill in the art upon review of the disclosure set forth herein.

Another embodiment of a frame 62 is shown in FIGS. 12 and 13. As with other embodiments, frame 62 has a framing member 112. The framing member 112 has a front surface 116, a back surface 117, a top portion 113 and a bottom portion 114 and outer edges forming a perimeter surface 115.

Also, as with other embodiments, the frame 62 further includes a mounting member arrangement, with at least two mounting members 120a and 120b, wherein the first mounting member 120a extends from the back surface 117 of the framing member 112 a distance that is greater than the distance that the second mounting member 120b extends from the back surface 117. As described with respect to other embodiments, this configuration enables the user to mount the frame 62 to the wall 30 by first positioning the frame 62 by inserting the first mounting member 120a and then rotating the frame 62 relative to the wall 30 about the first mounting member 120a to level the frame 62. When the desired level is achieved, the user can then press the second mounting member 120b into the wall 30, resulting in the mounted frame 62.

In this embodiment, at least one of the mounting members is a specialized fastener 61 as shown in detail in FIGS. 14 and 20. However, optionally, all of the mounting members in the frame 62 can be specialized fastener 61. Specialized fastener 61 comprises a first side 63 having a mounting shaft 122 and a second side 64 opposite first side and having a threaded retention member 65. The shaft 122 and the threaded retention member 65 preferably share a common axis of rotation. Between the mounting shaft 122 and the threaded retention member 65 is a head portion 66. The head portion 66 of fastener 61 has a first surface 67 and a second surface 68, each of the first and second surfaces forming a plane generally perpendicular to the axis of rotation of the mounting shaft 122 and the threaded retention member 65. The mounting shaft 122 extends from the first surface 67 and the threaded retention member 65 extends from the second surface 68. The head portion 66 also has a perimeter surface 69 generally perpendicular to the first surface 67 and second surface 68. The perimeter surface 69 contains a first non-curved portion 70, sometimes referred to herein as the contact surface 70. Fastener 61 is a ferrous material so that it can be attracted by a magnetic force.

As shown in FIG. 14, head portion 66 has a rotation feature 71 that permits a driving device 72 to rotate the fastener 61 about its axis thereby threading the threaded retention member 65 into the framing member 112. As shown in FIG. 14, in one embodiment, the rotation feature 71 may be a pair of recessed slots 74 in the first surface 67, wherein the recessed slots 74 extend radially outward from the shaft 122. In this embodiment, a driving device 72 such as the one shown in FIG. 13 may be used to thread the specialized fastener 61 into a framing member 112. Driving device 72 has a handle 73 and an axial shaft 74 extending from the handle 73. The axial shaft 74 terminates in a driving end 75, which in this embodiment is a pair of tips 76 separated by an opening 77. Tips 76 are sized to fit in recessed slots 74 and opening 77 is sized to receive mounting shaft 122. Other conventional rotation features such as square, hex, double-hex, cross, phillips, frearson, torq features and the like may be modified as disclosed herein such that a mounting shaft extends from the axis of the rotation feature 71. Similarly, conventional driving ends or bits may be modified to include a slot or recess 77 to receive the mounting shaft 122.

Figure 18:
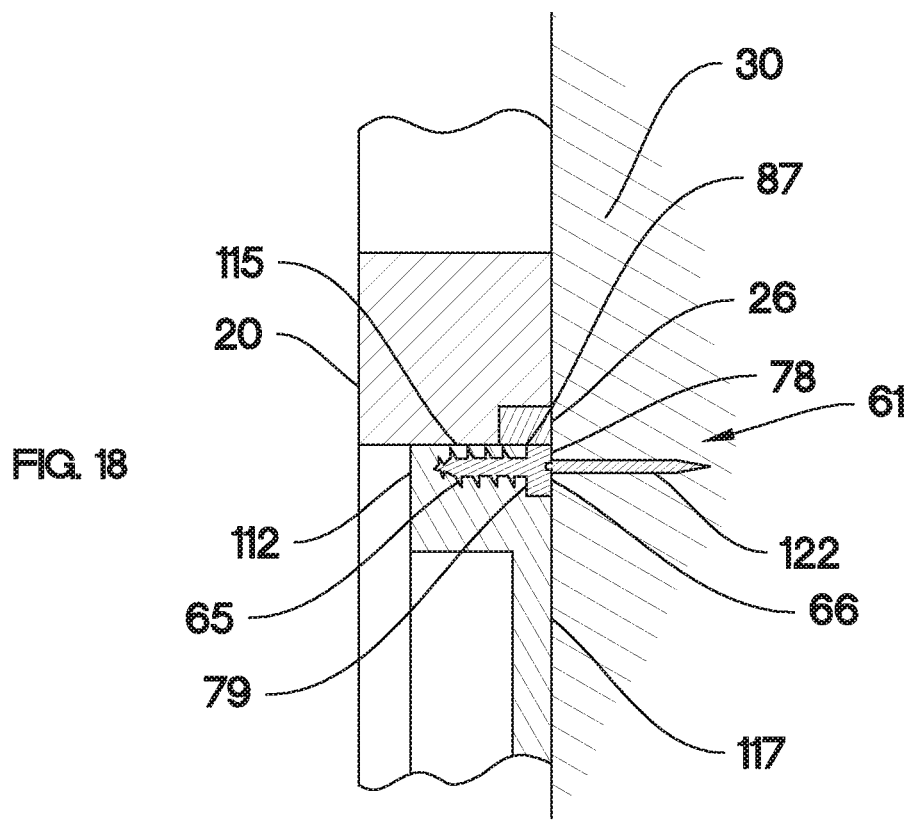
FIG. 18 is a partial cross sectional view taken at line J-J of the frame and alignment device of FIG. 16.

In the embodiment shown in FIGS. 13 and 18, the threaded retention member 65 is threaded into the framing member 112. The contact surface 70 of the head portion 66 of the specialized fastener 61 is generally flush with the perimeter surface 115 of a framing member 112 and the first surface 67 of the head portion 66 of the framing member 112 is either flush with or recessed from the plane of the back surface 117 of the frame 62. This configuration permits the back surface 117 of the frame 62 to be generally flush with the wall 30, thereby minimizing the gap between the back surface 117 of the frame and the wall 30.

Framing member 112 has a cavity 78 sized to receive head portion 66. Cavity 78 has a base 79 is abutted by the second surface 68 of the head portion 66 when the specialized fastener 61 is attached to the framing member 112. Cavity 78 intersects the edge of framing member 112, thereby creating an opening 77 in the perimeters surface 115 of the framing member 112, into which the contact surface 70 of the head portion 66 is aligned so that contact surface 70 of the head portion 66 is exposed. To improve alignment of the fastener 61 to the framing member and to minimize the risk of splitting the framing member during assembly, framing member 112 may also have a pre-drilled hole into which the threaded retention member is threaded.

FIGS. 15 and 16 disclose an alignment device 80 for mounting a plurality of frames having mounting posts. Alignment device 80 comprises a body 90 having a pair of horizontal members 81a, 81b intersecting a pair of vertical members 82a, 82b forming a cross. Alignment device 80 has a back surface 83, which is placed adjacent the wall when the alignment device 80 is used to mount frames, and a front surface 84 opposite the back surface 83. The horizontal and vertical members define four quadrants 85a, 85b, 85c, 85d, each of which can be used to position a frame. The width of each of the vertical members and the horizontal members is preferably identical so that the space between each frame is the same. Each horizontal member 81a, 81b has a top surface and a bottom surface, relative to the ground, generally perpendicular to the back surface of the alignment device 80. Each vertical member 82a, 82b has a first side surface and a second side surface opposite the first side surface, such that the first side surface and second side surfaces are each generally perpendicular to the back surface of the alignment device 80 and define an edge of one of the quadrants 85a, 85b, 85c, 85d. Collectively, the first side surface and second side surface of the vertical members 82a and the top surfaces and bottom surfaces of the horizontal members 81a are referred to herein as the "interior surfaces" of the alignment device 80. The quadrants 85a, 85b, 85c, 85d are each open on two adjacent sides, such that they can accommodate a variety of sizes of frames.

The alignment device 80 has at least one magnet 86 positioned in a recess 60 in one of either the horizontal or vertical members. Magnet 86 has a non-curved contact surface 87 for magnetically attracting and attaching the alignment device 80 to the contact surface 70 of the specialized fastener 61. The width of the magnet contact surface 87 is generally the same width as the specialized fastener contact surface 70.

Figure 19:
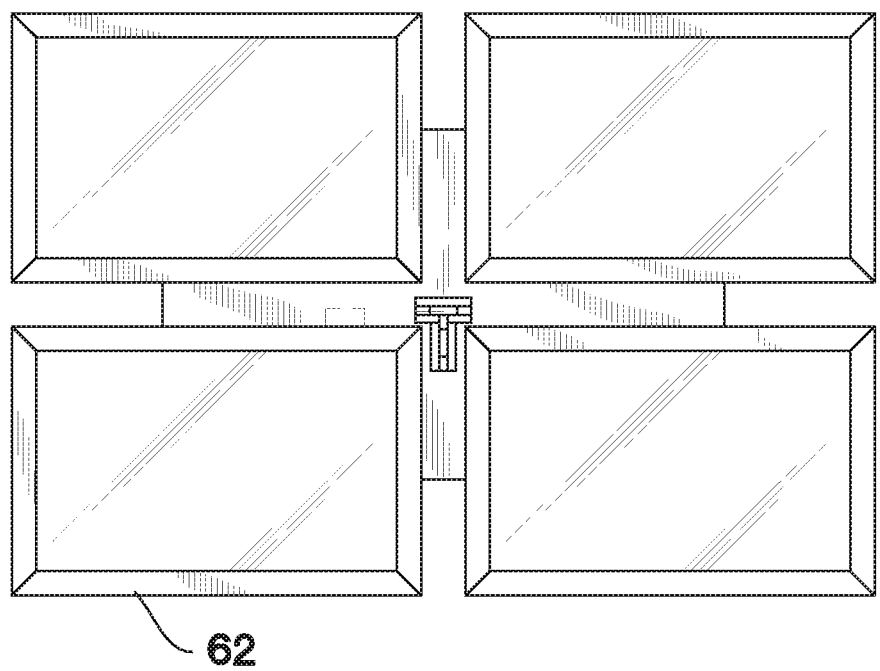
FIG. 19 is a front view of the alignment device of FIG. 15 being used to install a grid of frames.

The recess 60 is sized to receive the magnet 86 so that the contact surface of the magnet 86 is flush with one of the interior surfaces of the alignment device. The magnet 86 is also positioned proximate to the back surface of the alignment device 80 and preferably positioned so that it is flush with the back surface of the alignment device 80 as shown in FIG. 18. For example, if magnet 86 is positioned in horizontal member 81a, the distance from the intersection of the horizontal member 81a and the vertical member 82a to the edge of magnet 86 should be the same as the distance from the edge of the side of the frame 62, to the edge of the contact surface 70 of the fastener 61. Therefore, when magnet 86 is aligned with the contact surface 70 of the fastener 61, two edges of the frame 62 will be aligned with and adjacent two of the interior surfaces of the alignment device 80, as shown in FIG. 19. Magnet 86 is preferably, but not necessarily, located in the bottom surface of one of the horizontal members 81a, 81b.

The alignment device 80 is preferably made of a dense polyethylene foam or a similarly lightweight, yet rigid material. The magnet 86 may be adhered to the alignment device 80 using epoxy or a suitable adhesive.

The alignment device 80 also comprises a level 92 mounted to the body 90. The level 92 is preferably a bubble level, but may be a ball level or other suitable level. The level has a display that may be the level itself, as in the case of a bubble or ball level, or may be a component of the level, as in the case of a digital level. The level 92 is preferably positioned at the intersection of the vertical and horizontal members 81a, but could be located elsewhere on the body of the alignment device. Optionally, the level may comprise a pair of perpendicular levels, as shown in FIG. 15 so that the alignment device 80 may be used in either a horizontal or vertical orientation.

The alignment device 80 is used in conjunction with one or more frame having mounting posts to create a grid of evenly spaced, level, wall-mounted frames. The first installed frame (and optionally the subsequently installed frames) are frames 62 having a specialized fastener 61 as shown in FIGS. 12-14. To use the alignment device, an installer first presses the frame 62 against the wall 30 so that the mounting post that extends further from the back of the frame, i.e., the longer mounting post, 120a pierces into the wall 30, but the shorter mounting post 120b or posts do not, as described above with reference to the embodiment in FIG. 3. The installer then places the alignment device 80 on the frame 62 so that the magnet 86 is aligned with the contact surface 70 of the specialized fastener and a first outer edge of the frame is in contact with a first interior surface of the alignment device and a second outer edge of the frame is in contact with a second interior surface of the alignment device, as shown in FIG. 16. As shown in FIG. 16, the alignment device is preferably positioned such that the frame is in one of the lower quadrants 81a, 81b so that once the frame is fully mounted on the wall, the frame supports the weight of the alignment device 80 and the magnet 86 retains the alignment device 80 against the frame 62.

The user then rotates the frame 62 and the alignment device 80 secured to the frame by the magnet 86 as a single unit, relative to the wall 30 about the axis of the first mounting post 120a to the desired, level position using the display from the level to verify that the frame is level. As shown in FIG. 4, when the frame is in the desired position, the user then presses the framing member 112 closer to the wall 30 so that the second mounting post 120b pierces the wall, thereby preventing further rotation of the frame 62 relative to the wall 30.

Once the first frame is installed, the installer can then install additional frames having mounting posts in any one or more of the remaining three quadrants, using the interior surfaces of the body 90 of the alignment device as a template or guide. Advantageously, the already-installed frame supports the alignment device so that the alignment device can remain positioned against the wall without the need for the installer to hold the alignment device against the wall 30 or to use some other means to maintain the position of the alignment device. Thus, both of the installer's hands are free to select and install subsequent frames.

To install subsequent frames, as shown in FIG. 19 the installer only needs to align the frames with the interior surfaces of the alignment device and pressing the framing member to pierce mounting shafts 122 into the wall 30. Because the first frame has been leveled, and the subsequent frames are aligned using the alignment device 80, those subsequently installed frames need not be individually leveled. Once the desired number of frames have been mounted on the wall 30, the installer removes the alignment device 80 by pulling it away from the wall 30.

If the installer wishes to increase the size of the grid by adding additional frames, the installer can position the alignment device adjacent one or more of the previously installed frames, align a new frame with the interior surfaces of the alignment device and press the framing member 112 of the new frame to pierce the mounting shafts of the new frame into the wall 30. This can be repeated multiple times to create decorative grids or rows of frames, as desired.

As previously stated, the foregoing description is not provided to limit the invention to the embodiments described herein. Rather, the scope of the invention is intended to cover all embodiments that may fall within the scope of the following claims, either literally or under the doctrine of equivalents.

What is claimed is:

1. An alignment device for mounting a plurality of frames in a pattern on a mounting surface, wherein at least one of the frames has a magnetic portion within a perimeter surface of the frame, the alignment device comprising:
    a cross-shaped body having a pair of horizontal members and a pair of vertical members intersecting at a common point, the horizontal and vertical members having surfaces defining four quadrants, each of the quadrants allowing a portion of one of the plurality of frames to be positioned adjacent thereto for purposes of alignment with respect to the other frames;
    a level disposed within the cross-shaped body;
    a recess in one of the horizontal members or vertical members;
    a magnet mounted in the recess and positioned to be aligned with and magnetically attract the magnetic portion of the frame when placed on the perimeter surface of the frame;
    wherein the level is functionally visible when the alignment device is positioned with respect to the plurality of frames.

2. The alignment device of claim 1, wherein the magnet is disposed within one of the surfaces of one of the horizontal members or the vertical members.

3. The alignment device of claim 2, wherein the magnet is adjacent a back surface of the body.

4. The alignment device of claim 1, wherein the body is comprised of dense polyethylene foam.

5. The alignment device of claim 1, wherein the level comprises a pair of perpendicular levels.

6. An alignment device for mounting a plurality of frames in a pattern on a mounting surface, wherein at least one of the frames has a magnetic portion therein, the alignment device comprising:
    a body having at least one horizontal member and at least one vertical member defining at least one quadrant allowing a portion of one of the plurality of frames to be positioned adjacent thereto for purposes of alignment with respect to the other frames;
    a magnetic portion positioned to be magnetically attracted to the magnetic portion of the one of the plurality of frames positioned with respect to the defined quadrant of the alignment device; and
    a level portion that is functionally visible when the alignment device is positioned to be magnetically coupled to the one of the plurality of frames.

7. The alignment device of claim 6, wherein the magnetic portion of the alignment device comprises a magnet.

8. The alignment device of claim 6, wherein the magnetic portion of the alignment device comprises metallic portion.

9. The alignment device of claim 6, wherein the level is a bubble-style level.

10. A method of aligning a plurality of frames in a pattern on a mounting surface using an alignment device having a magnetic portion that magnetically interacts with a magnetic portion of each of the frames and a level, the method comprising the steps of:
    temporarily positioning a first one of the plurality of frames on the mounting surface;
    magnetically attaching the alignment device to the first one of the plurality of frames;
    leveling the first one of the plurality of frames with the level of the alignment device;
    mounting the first one of the plurality of frames on the mounting surface;
    aligning a second one of the plurality of frames with respect to the alignment device; and
    mounting the second one of the plurality of frames on the mounting surface.

11. The method of claim 10, further comprising the steps of:
    aligning a third one of the plurality of frames with respect to the alignment device; and
    mounting the third one of the plurality of frames on the mounting surface.

* * * * *